United States Patent
Agiwal et al.

(10) Patent No.: US 8,457,158 B2
(45) Date of Patent: Jun. 4, 2013

(54) METHOD AND SYSTEM FOR ENCODING AND DECODING LENGTH OF MEDIUM ACCESS CONTROL PROTOCOL DATA UNIT

(75) Inventors: Anil Agiwal, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 12/834,208

(22) Filed: Jul. 12, 2010

(65) Prior Publication Data

US 2011/0007753 A1    Jan. 13, 2011

(30) Foreign Application Priority Data

Jul. 13, 2009  (IN) .................. 1662/CHE/2009PS
Jul. 2, 2010   (IN) .................. 1662/CHE/2009CS

(51) Int. Cl.
*H04J 3/16*    (2006.01)
*H04J 3/22*    (2006.01)

(52) U.S. Cl.
USPC ............ 370/470; 370/473; 370/474; 370/476

(58) Field of Classification Search
USPC ............. 370/470, 338, 315, 310, 473, 474, 370/476; 709/236
See application file for complete search history.

(56) References Cited

U.S. PATENT DOCUMENTS

| | | | |
|---|---|---|---|
| 6,590,882 B1 | 7/2003 | Fong et al. | |
| 2008/0117996 A1* | 5/2008 | Kim et al. | 375/261 |
| 2008/0187136 A1* | 8/2008 | Zhang et al. | 380/270 |
| 2009/0168770 A1* | 7/2009 | Mohanty | 370/389 |
| 2009/0245166 A1* | 10/2009 | Okuda | 370/315 |
| 2009/0310583 A1* | 12/2009 | Suzuki | 370/338 |
| 2010/0214986 A1* | 8/2010 | Agiwal et al. | 370/328 |
| 2010/0265903 A1* | 10/2010 | Maheshwari | 370/329 |
| 2011/0299443 A1* | 12/2011 | Lee et al. | 370/310 |
| 2012/0014366 A1* | 1/2012 | Kim et al. | 370/338 |
| 2012/0113877 A1* | 5/2012 | Lee et al. | 370/310 |

OTHER PUBLICATIONS

U.S. Appl. No. 61/178,499, filed May 15, 2009.*
U.S. Appl. No. 61/144,451, filed Jan. 14, 2009.*
U.S. Appl. No. 61/168,938, filed Apr. 14, 2009.*
Huawei, 'Concatenated MAC-hs PDU,' 3GPP Draft R2-061211, 3GPP TSG-RAN-WG2 Meeting # 53, May 8-12, 2006.
Tao et al. 'Performance Improvement for Multichannel HARQ Protocol in Next Generation WiMAX System.' In: IEEE Wireless Communications and Networking Conference. 2008, pp. 2009-2014. See section II.A; figure 1.
Agiwal et al. 'Proposed Text on Construction and Transmission of MAC PDU section for AWD.' IEE 802.16 Broadband Wireless Access Working Group, Apr. 27, 2009.

* cited by examiner

*Primary Examiner* — Chuong T Ho
(74) *Attorney, Agent, or Firm* — Jefferson IP Law, LLP

(57) ABSTRACT

A method and system for encoding the length of a Medium Access Control (MAC) Protocol Data Unit (PDU) is provided. The method includes partitioning the length of the MAC PDU into a first part and a second part when the length of the MAC PDU is greater than a first predefined value, encoding the first part in a first header of the MAC PDU, encoding the second part in a second header of the MAC PDU, encoding the length of the MAC PDU in a first header of the MAC PDU when the length of the MAC PDU is less than or equal to first predefined value, and transmitting the MAC PDU with the encoded length of the MAC PDU to a receiving communication device. In another embodiment, the invention includes a method and apparatus for decoding an encoded length of a MAC PDU.

22 Claims, 14 Drawing Sheets

(PELATED ART)

(PELATED ART)

(PELATED ART)

METHOD AND SYSTEM FOR ENCODING AND DECODING LENGTH OF MEDIUM ACCESS CONTROL PROTOCOL DATA UNIT

PRIORITY

This application claims the benefit under 35 U.S.C. §119 (a) of an Indian patent application filed in the Indian Intellectual Property Office on Jul. 13, 2009 and assigned Serial No. 1662/CHE/2009 Provisional Specification (PS) and an Indian patent application filed in the Indian Intellectual Property Office on Jul. 2, 2010 and assigned Serial No. 1662/CHE/2009 Complete Specification (CS), the entire disclosures of each of which are hereby incorporated by reference.

BACKGROUND OF THE INVENTION

1. Field of the Invention

The present invention relates to wireless communication system protocols. More particularly, the present invention relates to the field of encoding and decoding the length of a Medium Access Control (MAC) Protocol Data Unit (PDU) in a broadband wireless network.

2. Description of the Related Art

Broadband wireless networks are based on various communication standards, for example, the Institute of Electrical and Electronics Engineers (IEEE) 802.16e based Worldwide Interoperability for Microwave Access (WiMAX) standard, and its evolution to IEEE 802.16m, provides various types of services such as voice, packet data exchange, and the like. In such a network, user data and control information is exchanged between a Mobile Station (MS) and a Base Station (BS) by establishing a connection. The control information is generated by various protocols running at the MS and the BS. The data packets are generated by various applications at the MS and BS. Typically, wireless communication standards beyond 3G, for example 3GPP Long Term Evolution (LTE), IEEE 802.20, and IEEE 802.16e-2005, mobile WiMAX, and the like, use Protocol Data Units (PDUs) to carry the control and data information.

The IEEE 802.16m communication standard is associated with a protocol architecture that includes Physical (PHY) layer and Medium Access Control (MAC) layer specifications. The MAC layer comprises three sub-layers which include the specific Convergence Sub-layer (CS), the MAC Common Part Sub-layer (MAC CPS), and the security sub-layer. The CS provides transformation and/or mapping of external network data, received through the CS Service Access Point (SAP), into MAC Service Data Units (SDUs) received by the MAC CPS through the MAC SAP. This includes classifying external network SDUs and associating the external network SDUs to an appropriate MAC connection. It may also include other functions such as Payload Header Suppression (PHS).

The MAC CPS receives data from the various CSs, through the MAC SAP, classified to particular MAC connections. Data is transferred between the MAC CPS and the PHY layer via the PHY SAP. The MAC CPS also contains a separate security sub-layer that provides authentication, secure key exchange, and encryption. The MAC CPS forms an IEEE 802.16m based MAC PDU. The MAC PDU format includes a Generic MAC Header (GMH), an Extended Header (EH) group, and payload. Each connection payload includes one or more MAC SDUs or MAC SDU fragments received from the CS layer for the particular connection.

Further, the GMH format (based on the IEEE 802.16m standard) includes a Flow Identifier (Flow ID) field, an Extended Header (EH) field, and a Length field. A connection is identified by the Flow ID field. The EH field indicates whether an extended header group is present in the MAC PDU or not. Further, the Length field gives information about the length of the MAC PDU. The EH group includes a fixed portion that indicates the EH group length. The EH group also includes a variable portion following the fixed portion which consists of one or more EHs. The EH contains a type field and a body contents field. The type field indicates the type of EH and the body contents field indicates the type-dependent contents.

The MAC layer encodes multiple MAC PDUs (MPDUs) to form a MAC layer packet, which is then sent to a PHY layer for transmitting on the air. The size (in bytes) of the MAC layer packet formed by the MAC Layer is equal to the number of bytes requested by the PHY layer from the MAC layer. Thereafter, the multiple MAC PDUs that are encoded in the MAC layer packet are sent from the PHY layer of a transmitting communication device to a PHY layer of a receiving communication device.

The maximum size of the MAC PDU can be 2047 bytes because the size of the Length field in the GMH is '11' bits. In a high data rate system, the MAC SDUs carried in the MAC PDU can be much larger than 2047 bytes. In order to carry such large MAC SDUs, the MAC SDUs need to be fragmented and multiple MAC PDUs, each carrying one fragment of the MAC SDU, are formed and concatenated together in one physical layer packet. This approach causes increased overhead because of the GMH overhead (2 bytes) and fragmentation/packing information overhead (2 bytes per MAC SDU fragment). For a MAC SDU, which is carried in 'n' MAC PDUs, the additional overhead of '4*(n−1)' bytes is incurred. Accordingly, the MAC PDU needs to have a larger Length field to facilitate carrying of larger MAC SDUs in one MAC PDU.

Further, the process of carrying a large MAC SDU in the form of multiple MAC PDUs in a MAC layer packet also consumes more Automatic Repeat reQuest (ARQ) sequence numbers as an ARQ sequence number is assigned per MAC PDU. This leads to more frequent polling for a feedback request to avoid stalling of the transmitter ARQ window. Hence, the MAC PDU needs to have a larger Length field to facilitate carrying of larger MAC SDUs in one MPDU.

Also, in the current MAC PDU format, the MAC PDU can carry payload from multiple connections. The multiplexing approach reduces security overhead significantly. Hence, if 'n' connection payloads are multiplexed in one MAC PDU, then 12*(n−1) bytes of overhead are saved. The smaller size of the Length field does not allow multiplexing if the size of the multiplexed payload and the headers is greater than 2047 bytes. Therefore, multiple MAC PDUs are formed, one for each connection, and concatenated together in one MAC layer packet. This has an additional overhead of 2*(n−1)+12* (n−1) bytes for 'n' connection payloads. Thus, the multiplexed MAC PDU needs to have a larger Length field to facilitate multiplexing.

Hence there exists a need to efficiently encode and decode the length of the MAC PDU in the MAC layer packet.

SUMMARY OF THE INVENTION

An aspect of the present invention is to address at least the above-mentioned problems and/or disadvantages and to provide at least the advantages described below. Accordingly, an aspect of the present invention is to provide a system and method for encoding and decoding the length of a Medium Access Control (MAC) Protocol Data Unit (PDU).

In accordance with an aspect of the present invention, a method for encoding the length of a Medium Access Control (MAC) Protocol Data Unit (PDU) is provided. The method includes partitioning the length of the MAC PDU into a first part and a second part when the length of the MAC PDU is greater than a first predefined value, encoding the first part in a first header of the MAC PDU, encoding the second part in a second header of the MAC PDU, encoding the length of the MAC PDU in the first header of the MAC PDU when the length of the MAC PDU is less than or equal to the first predefined value, and transmitting the MAC PDU with the encoded length of the MAC PDU to a receiving communication device.

In accordance with another aspect of the present invention, a method for decoding the length of a MAC PDU is provided. The method includes receiving the MAC PDU with the length of the MAC PDU encoded from a transmitting device, determining the presence of a first header and a second header and decoding the length of the MAC PDU from the first header and the second header of the MAC PDU when the first header and the second header are present in the MAC PDU, and determining the presence of the first header and the second header and decoding the length of the MAC PDU from the first header of the MAC PDU when only the first header is present in the MAC PDU.

In accordance with yet another aspect of the present invention, a communication device for encoding the length of a Medium Access Control (MAC) Protocol Data Unit (PDU) is provided. The communication device includes a processor and a transceiver. The transceiver transmits a MAC PDU including an encoded MAC PDU length. The processor partitions the length of the MAC PDU into a first part and a second part when the length of the MAC PDU is greater than a first predefined value, encodes the first part in a first header of the MAC PDU and the second part in a second header of the MAC PDU, and encodes the length of the MAC PDU in a first header of the MAC PDU when the length of the MAC PDU is less than or equal to the first value.

In accordance with still another aspect of the present invention, a communication device for decoding the length of a Medium Access Control (MAC) Protocol Data Unit (PDU) is provided. The device includes a transceiver for receiving the MAC PDU with encoded length of the MAC PDU from a transmitting device and a processor for determining the presence of a first header and a second header, for decoding the length of the MAC PDU from the first header and the second header of the MAC PDU when the first header and the second header are present in the MAC PDU, and for decoding the length of the MAC PDU from the first header of the MAC PDU when only the first header is present in the MAC PDU.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description, with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the dictionary meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 14, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid in the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
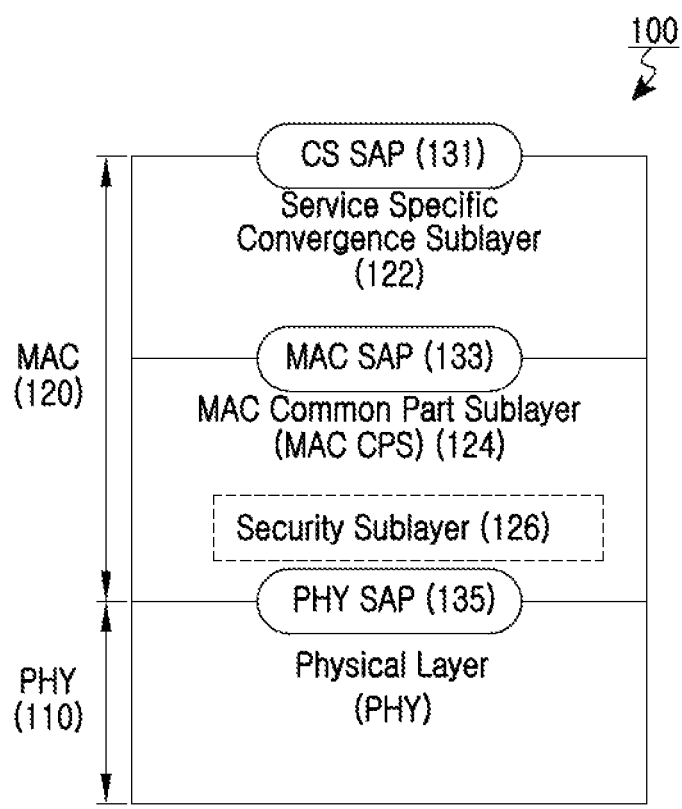
FIG. 1 illustrates a protocol architecture of a wireless communication system according to an exemplary embodiment of the present invention.

FIG. 1 illustrates a protocol architecture of a wireless communication system according to an exemplary embodiment of the present invention.

Referring to FIG. 1, the IEEE 802.16m protocol architecture 100 defines the Physical (PHY) layer 110 and Medium Access Control (MAC) layer 120 specifications. The MAC layer 120 includes a service specific Convergence Sub-layer (CS) 122, a MAC Common Part Sub-layer (MAC CPS) 124, and a security sub-layer 126.

The CS 122 provides transformation or mapping of external network data, received through the CS Service Access Point (SAP) 131, into MAC Service Data Units (SDUs) received by the MAC CPS 124 through the MAC SAP 133. This includes classifying external network SDUs and associating external network SDUs with the proper MAC connection. This also includes other functions such as Payload Header Suppression (PHS).

The MAC CPS 124 receives data from the various CSs, through the MAC SAP 133, associated with specific types of MAC connections. Data is transferred between the MAC CPS 124 and the PHY layer 110 via the PHY SAP 135. The MAC CPS 124 also contains a separate security sub-layer 126 providing authentication, secure key exchange, encryption, and the like. The connection information and data will be stored in multiple MAC PDUs. The MAC layer 120 encodes the available MAC PDUs (MPDUs) to form a MAC layer packet, which is then sent to the PHY layer 110 for transmitting over the air.

Figure 2A:
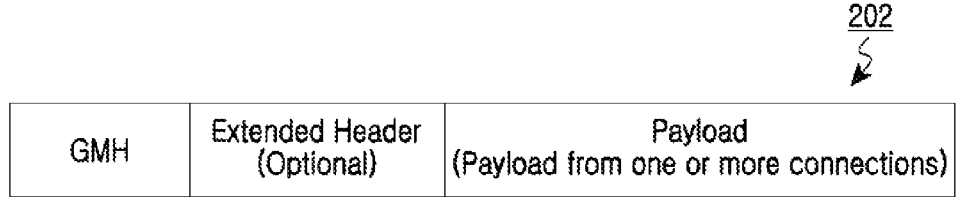
FIGS. 2A to 2C illustrate a MAC layer packet according to the related art.
Figure 2B:
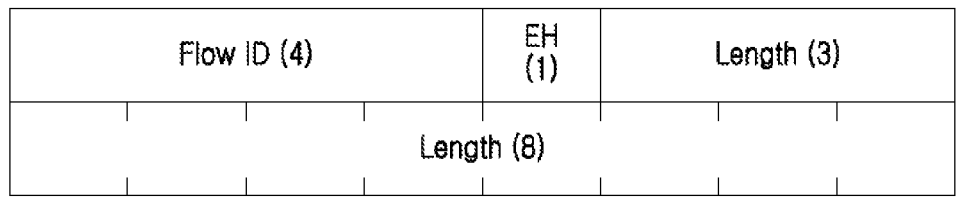
Figure 2C:
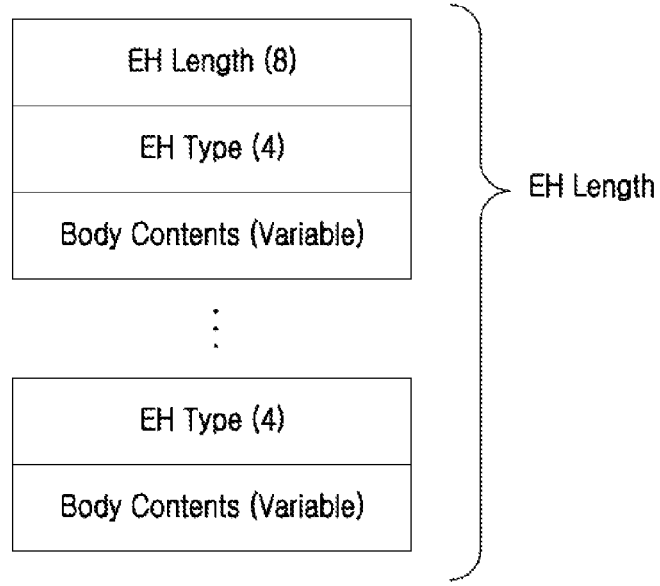

FIGS. 2A to 2C illustrate a MAC layer packet according to the related art.

Referring to FIGS. 2A to 2C, MAC PDUs are encoded in a MAC layer packet and are transmitted from one PHY layer to another PHY layer. The MAC common part sub-layer forms MAC PDUs. A generic IEEE 802.16m based MAC PDU format is depicted in a MAC PDU format 202 in FIG. 2A. The MAC PDU format 202 includes a Generic MAC Header (GMH), an Extended Header (EH) group, and payload. The payload includes payloads from one or more connections. Each connection payload includes one or more MAC SDU or MAC SDU fragment received from a CS layer for that connection. An IEEE 802.16m based GMH format is shown as a GMH format 204 in FIG. 2B.

The GMH format 204 includes a Flow Identifier (Flow ID) field with which a connection is identified. The GMH format 204 also includes an EH field to indicate whether an EH is present in the MAC PDU. The GMH format 204 further includes a Length field to identify the length of the MAC PDU. An EH group format 206 is shown in FIG. 2C. The EH group 206 is shown to include various fields such as an EH length field of 8 bits, an EH Type field of '4' bits, and variable body contents. The available MAC PDUs are arranged in a MAC layer packet and then transmitted from the MAC layer to the PHY layer to be transmitted further.

The size of the MAC layer packet is decided by the PHY layer. In an exemplary embodiment, the size (in bytes) of a MAC layer packet formed by the MAC layer is equal to the number of bytes requested by the PHY layer from the MAC layer. The PHY layer can request up to 14400 bytes of information. The MAC layer is limited to forming a largest MAC PDU of 2047 bytes due in part to the size of the Length field in the GMH header of the MAC PDU being only 11 bits, as shown in the GMH format 204. Thus, when the MAC layer receives a request of more than 2047 bytes from the PHY layer, a larger size of Length field is needed. For example, 14 bits of Length field are needed to support the largest PHY packet.

According to exemplary embodiments of the present invention, two different sizes in bits used to encode the MAC PDU length are defined. These are represented by $Length_{Long}$ and $Length_{Short}$. If the length of the MAC PDU is less than or equal to $2^{Length_{Short}}-1$, it is represented by $Length_{Short}$ bits and is encoded in a first header of a MAC PDU. On the other hand, if the length of MAC PDUs is greater than $2^{Length_{Short}}-1$, it is represented by $Length_{Long}$ bits wherein the $Length_{Long}$ bits are divided into a first part and a second part and are encoded in a first and a second header in the MAC PDU. For example, $Length_{Long}$ bits may be divided as a first part of 'x' bits and a second part of 'y' bits. The size of the first part is a size in bits of a length field in the first header and the size of the second part is a difference between $Length_{Long}$ bits and the size of the first part. The 'x' bits are encoded in the GMH and the 'y' bits are encoded in the second header apart from the GMH. In an exemplary embodiment, the second header is a Length Extended Header (LEH). In accordance with another exemplary embodiment, the second header is a Multiplexed Extended Header (MEH). In accordance with yet another exemplary embodiment, the second header is an EH group.

For example, if the MAC PDU length is greater than 2047 bytes then the MAC PDU is represented by $Length_{Long}$ of 12 or more bits, for example 14 bits. The 14 bit length of the MAC PDU is divided in two parts, say '11' bits and '3' bits. Thus, as the GMH header can include '11' bits, '11' bits of length are encoded in the GMH and the remaining '3' bits of length can be encoded in the second header, for example the LEH, the MEH or the EH group. In an exemplary embodiment, the GMH encodes Least Significant Bits (LSBs) of the length and the second header encodes Most Significant Bits (MSBs) of the length. Hence, the '11' bits are the LSBs of the length and the '3' bits are the MSBs of the length. In another exemplary embodiment, the GMH field encodes MSBs of the length and the second header encodes LSBs of the length. Thus, the '11' bits are MSBs and the '3' bits are LSBs.

Figure 3:
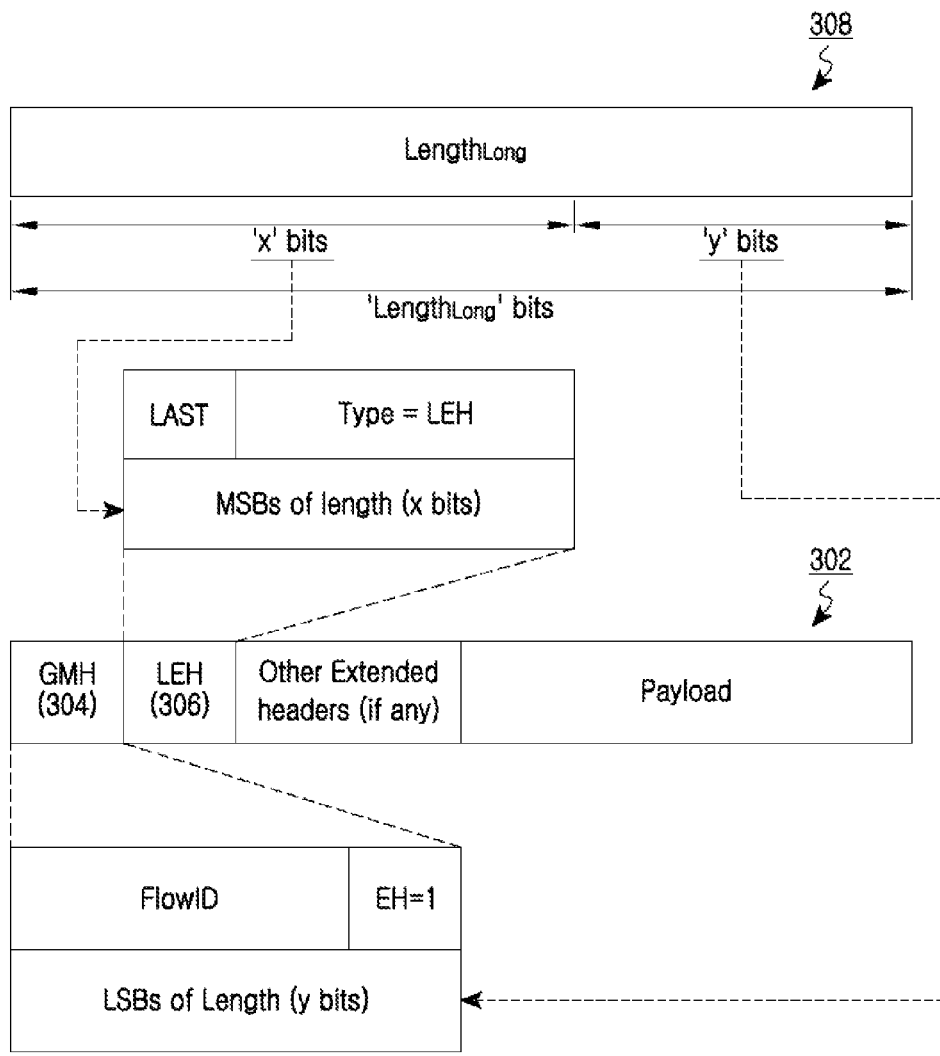
FIG. 3 illustrates a method for encoding the length of a MAC PDU according to an exemplary embodiment of the present invention.

FIG. 3 illustrates a method for encoding the length of a MAC PDU according to an exemplary embodiment of the present invention.

Referring to FIG. 3, the length of the MAC PDU is encoded in $Length_{Long}$ number of bits in the MAC PDU using a GMH and an LEH. The MAC PDU 302 is shown to include the GMH 304, the LEH 306, another extended section (if any), and a payload section.

The MAC PDU length is portioned in two parts as shown in section 308. A first part including 'y' bits is encoded in the GMH 304 and a second part including 'x' bits is encoded in the LEH 306. In an exemplary embodiment, LSBs ('y' bits) are encoded in the GMH 304 and MSBs ('x' bits) are encoded in the LEH 306. The GMH 304 is capable of encoding up to '11' bits of length. Hence, in an example, '11' bits of the length are encoded in the GMH 304. In an exemplary embodiment, the GMH 304 encodes 11 LSBs of the length. In the GMH 304, the EH field is set to '1' which notifies that there is an EH associated with the MAC PDU. Hence, the remaining bits of the length are encoded in the LEH 306 of the MAC PDU. The LEH 306 comprises a Type field to indicate the LEH type and a Length field to encode the second part of the length of the MAC PDU.

In accordance with an exemplary embodiment of the present invention, the MSBs of the MAC PDU length are encoded in the LEH 306. Thus for example, if the length of the MAC PDU is 14 bits, then the 11 LSBs of the length are encoded in the GMH 304 and the remaining '3' MSBs of the length are encoded in the LEH 306. In an exemplary embodiment, the LSBs are encoded in the LEH 306. Thus for example, if the length is 14 bits, then the 11 MSBs of the length are encoded in the GMH 304 and the remaining '3' LSBs of the length are encoded in the LEH 306.

Figure 4:
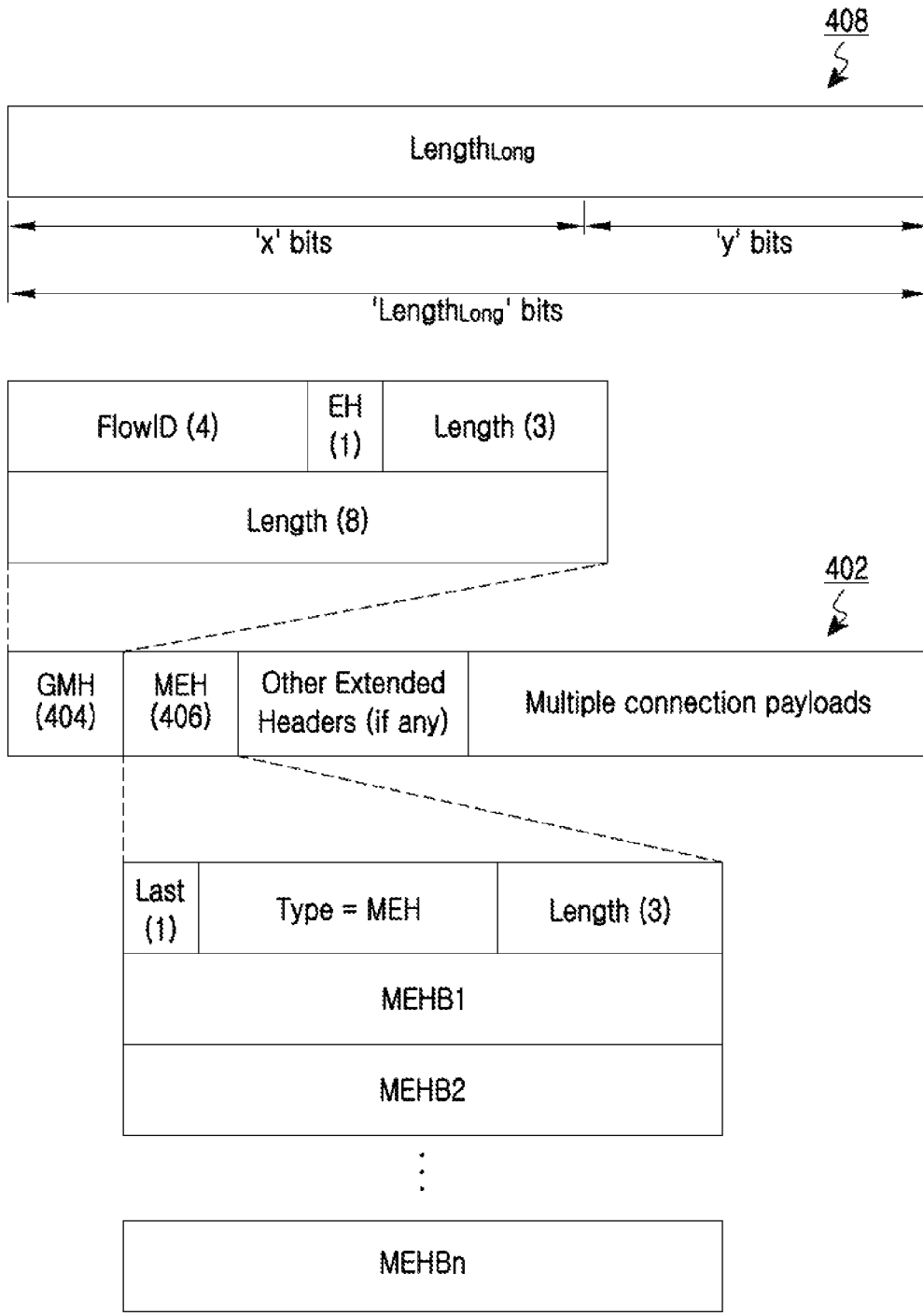
FIG. 4 illustrates a method for encoding the length of a MAC PDU according to an exemplary embodiment of the present invention.

FIG. 4 illustrates a method for encoding the length of a MAC PDU according to an exemplary embodiment of the present invention.

Referring to FIG. 4, the length of the MAC PDU is encoded in $Length_{Long}$ number of bits in the MAC PDU using a GMH and an MEH. The MAC PDU 402 is shown to include a GMH section 404, an MEH section 406, another extended section (if any), and a Multiple payload section.

The MAC PDU length is partitioned in two parts as shown in section 408. A first part is encoded in the GMH and a second part is encoded in the MEH 406 when the MAC PDU is a multiplexed MAC PDU. The GMH 404 is capable of encoding 11 bits of length. Hence, in an example, '11' bits of the length are encoded in the GMH 404. In an exemplary embodiment, the GMH 404 encodes LSBs of the length. In the GMH 404, the EH field is set to '1' which notifies that there is an EH associated with the MAC PDU. Hence, the remaining bits of the length are encoded in the MEH 406 of the MAC PDU. The MEH 406 comprises a Type field to indicate an MEH type and a Length field to encode the second part of the length of the MAC PDU.

In accordance with an exemplary embodiment of the preset invention, MSBs of the length are encoded in the MEH 406. Thus for example, if the length is '14' bits, then '11' LSBs of the length are encoded in the GMH 404 and the remaining '3' MSBs of the length are encoded in the MEH 406. In an exemplary embodiment, LSBs of the length are encoded in the MEH 406. Thus for example, if the length field is of '14' bits then the '11' MSBs of the length are encoded in the GMH 404 and the remaining '3' LSBs of the length are encoded in the MEH 406. In an exemplary embodiment, the '3' bit length does not add overhead to the MEH because reserved bits exist at the end of the MEH 406 for octet alignment.

Figure 5:
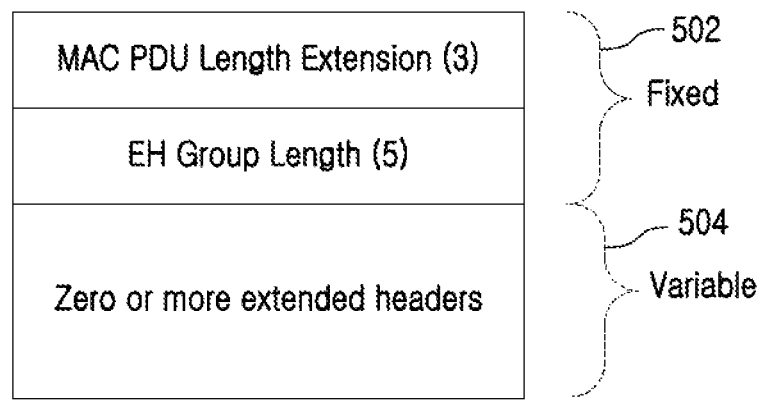
FIG. 5 illustrates a method for encoding the length of a MAC PDU according to an exemplary embodiment of the present invention.

FIG. 5 illustrates a method for encoding the length of a MAC PDU according to an exemplary embodiment of the present invention.

Referring to FIG. 5, an EH group format is explained. The EH group includes a fixed portion 502 that will include a MAC PDU Length Extension field of '3' bits and an EH group Length of '5' bits. Further, the EH group format includes a variable portion 504 that includes a zero or more EH field.

The MAC PDU length represented by $Length_{Long}$ is divided in two parts. One part is encoded in the GMH and a second part is encoded in the MAC PDU length extension field in the fixed portion 502 of the EH group. The GMH is capable of encoding a length of 11 bits. Hence, in an example, '11' bits of length are encoded in the GMH. In an exemplary embodiment, the GMH encodes LSBs of the length. In the GMH, the EH field is set to '1' which notifies that there is an EH associated with the MAC PDU. Hence, the remaining bytes of the length are encoded in the MAC PDU Length Extension field in the fixed portion 502 of the EH group.

In accordance with an exemplary embodiment, MSBs of the length are encoded in the fixed portion 502 of the EH group. Thus for example, if the length is '14' bits, then the '11' LSBs of the length are encoded in the GMH and the remaining '3' MSBs of the length are encoded in the MAC PDU Length Extension field in fixed portion 502 of the EH group. In an exemplary embodiment, LSBs of the length are encoded in the MAC PDU length extension field in fixed portion 502 of the EH group. Thus for example, if the length field is of '14' bits, then the '11' MSBs of the length are encoded in the GMH and the remaining '3' LSBs of the length are encoded in the MAC PDU length extension field in fixed portion 502 of the EH group.

Figure 6:
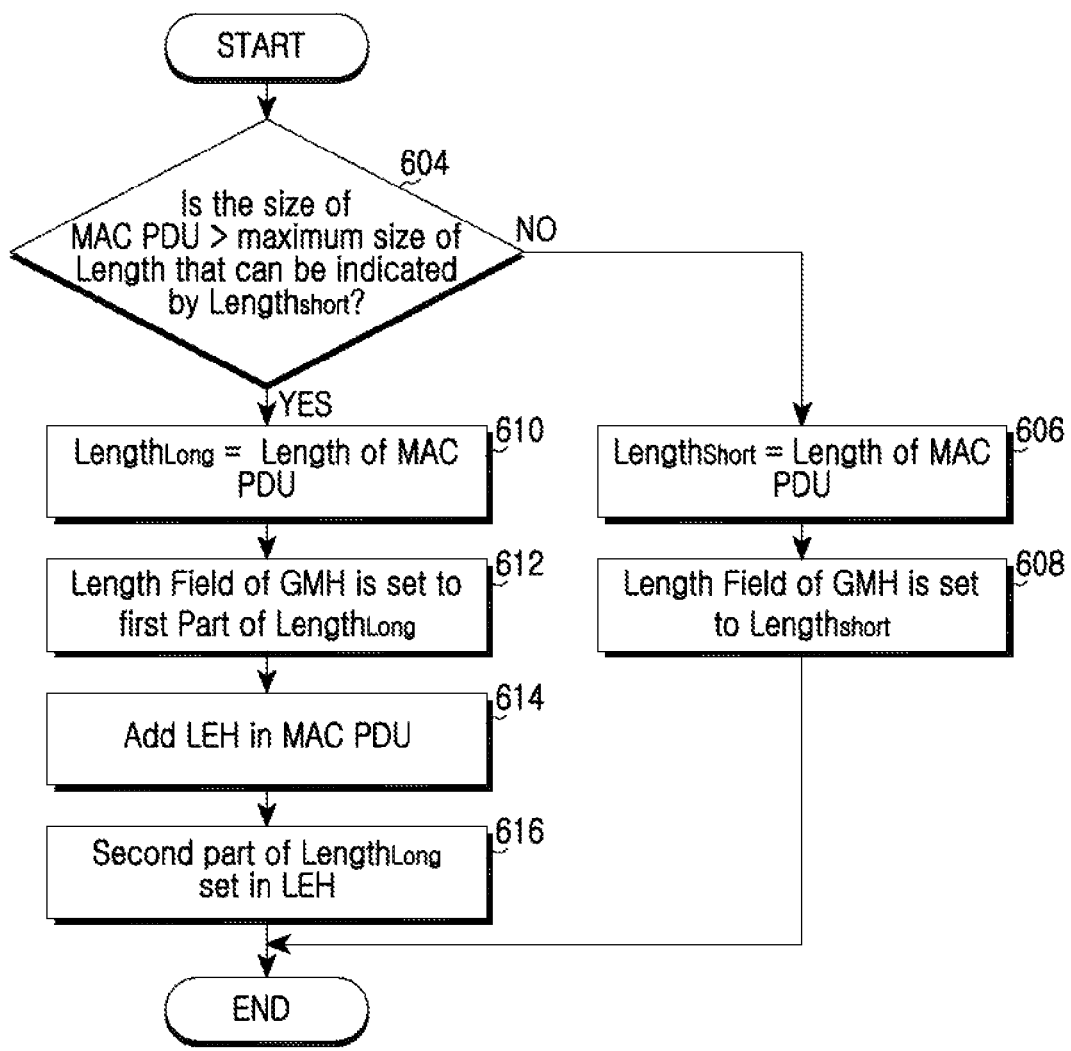
FIG. 6 is a flowchart illustrating a method for encoding the length of a MAC PDU according to an exemplary embodiment of the present invention.

FIG. 6 is a flowchart illustrating a method for encoding the length of a MAC PDU according to an exemplary embodiment of the present invention.

Referring to FIG. 6, it is determined in step 604 whether the size of the MAC PDU is greater than the maximum size of length that can be encoded in $Length_{Short}$ bits. If it is determined in step 604 that the size of the MAC PDU is less than or equal to the maximum size of the length that can be encoded in $Length_{Short}$ bits, the length (represented as $Length_{Short}$) is set equal to the length of the MAC PDU in step 606. At step 608, the length field of the GMH is set to $Length_{Short}$. The method then terminates.

On the other hand, if it is determined in step 604 that the size of the MAC PDU is greater than the maximum size of the length that can be encoded in $Length_{Short}$ bits, the value of $Length_{Long}$ is set equal to the length of the MAC PDU in step 610 because the length is longer than the maximum length that can be encoded in $Length_{Short}$ bits. In an exemplary embodiment, the length, for example $Length_{Long}$ is then partitioned in two parts. In step 612, the Length field of the GMH is set to the first part of $Length_{Long}$. In an exemplary embodiment, the first part is of a predefined number of bits. For example, the first part is equal to the number of bits of the Length field that the GMH contains. In an exemplary embodiment, the first part is the predefined number of bits which are the LSBs of $Length_{Long}$. In another exemplary embodiment, the first part is the predefined number of bits which are the MSBs of the $Length_{Long}$.

In step 614, an LEH is included in the MAC PDU. In step 616, a second part from the two parts is encoded in the LEH of the MAC PDU. In an exemplary embodiment, the MSBs of $Length_{Long}$ are encoded in the LEH. In another exemplary embodiment, the LSBs of $Length_{Long}$ are encoded in the LEH. Then, the method is terminated.

Figure 7:
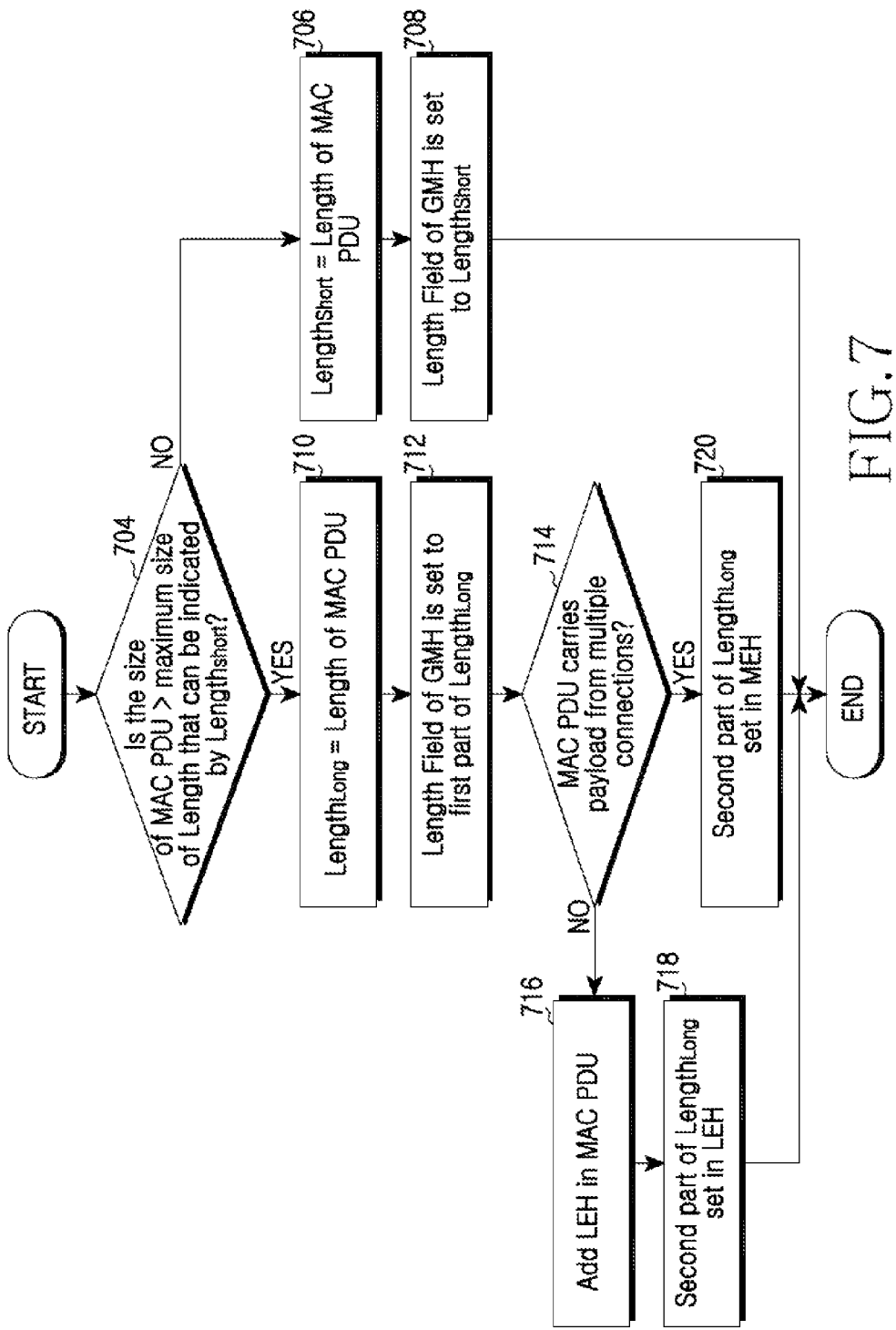
FIG. 7 is a flowchart illustrating a method for encoding the length of a MAC PDU according to an exemplary embodiment of the present invention.

FIG. 7 is a flowchart illustrating a method for encoding the length of a MAC PDU according to an exemplary embodiment of the present invention.

Referring to FIG. 7, it is determined in step 704 whether the size of the MAC PDU is greater than the maximum length that can be encoded in $Length_{Short}$ bits. If it is determined in step 704 that the size of the MAC PDU is less than or equal to the maximum size of the length that can be encoded in $Length_{Short}$ bits, the length (represented as $Length_{Short}$) is set equal to the length of the MAC PDU in step 706.

In step 708, the Length field of the GMH is set to $Length_{Short}$ and the method then terminates.

On the other hand, if it is determined in step 704 that the size of the MAC PDU is greater than the maximum size of the length that can be encoded in $Length_{Short}$ bits, $Length_{Long}$ is set to the length of the MAC PDU in step 710. In an exemplary embodiment, the length, for example $Length_{Long}$, is then partitioned into a first part and a second part. In step 712, the Length field of the GMH is set to a first part of $Length_{Long}$. In an exemplary embodiment, the first part is a predefined number of bits. For example, the first part is equal to the number of bits that the Length field of a GMH can include. In another exemplary embodiment, the first part is the predefined number of bits which are the LSBs of $Length_{Long}$. In another embodiment, the first part is the predefined number of bits which are the MSBs of $Length_{Long}$.

In step 714, it is determined whether the MAC PDU carries multiple connections. If it is determined in step 714 that the MAC PDU does not carry multiple connections, the LEH is added in the MAC PDU in step 716 as the MAC does not contain multiple connections such that there is no requirement to include an MEH. In step 718, the second part of $Length_{Long}$ is encoded in the LEH of the MAC PDU. In an exemplary embodiment, the MSBs of the $Length_{Long}$ are encoded in the LEH. In another exemplary embodiment, the LSBs of the $Length_{Long}$ are encoded in the LEH.

On the other hand, if it is determined in step 714 that the MAC PDU carries multiple connections, the second part of $Length_{Long}$ is encoded in the MEH in step 720 because the MAC PDU carries the multiple connections. In an exemplary embodiment, the MSBs of $Length_{Long}$ are encoded in the MEH. In another exemplary embodiment, the MSBs of $Length_{Long}$ are encoded in the MEH. Then, the method is terminated.

Figure 8:
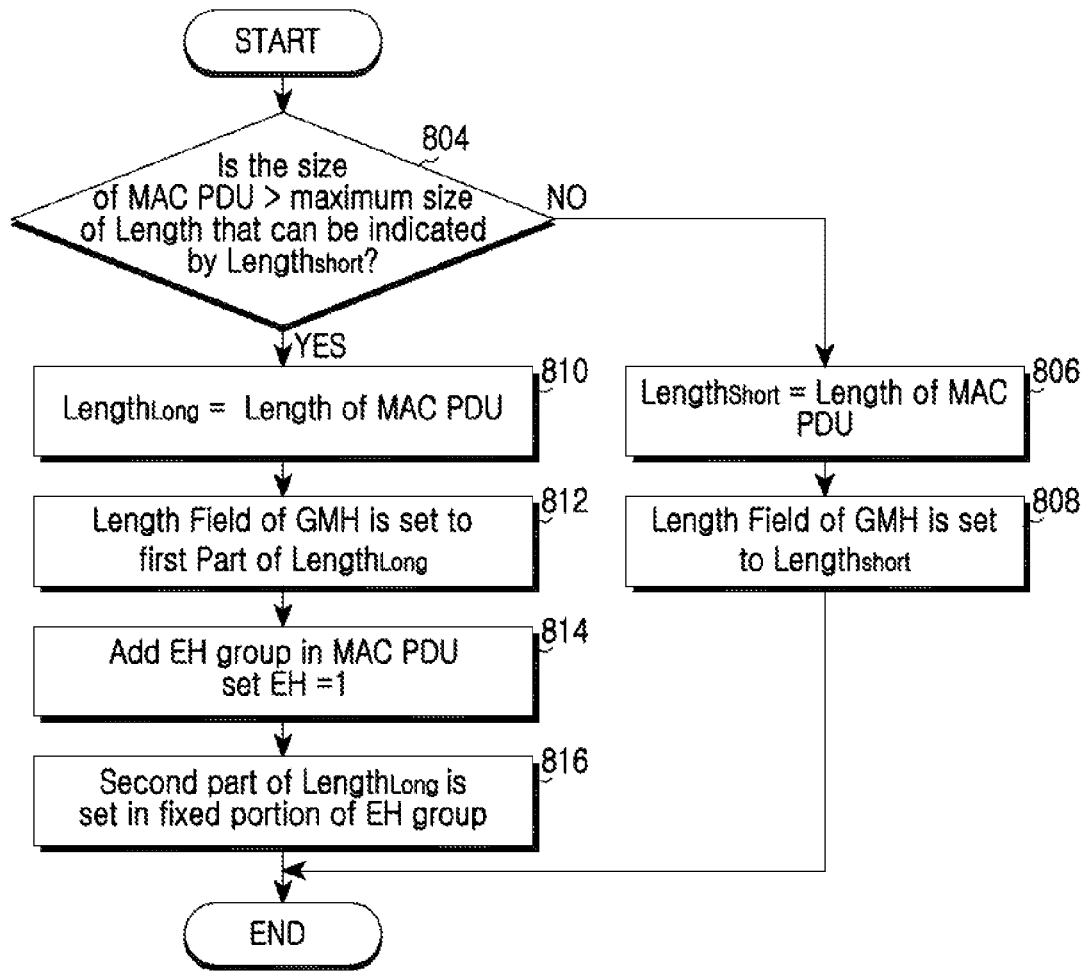
FIG. 8 is a flowchart illustrating a method for encoding the length of a MAC PDU according to an exemplary embodiment of the present invention.

FIG. 8 is a flowchart illustrating a method for encoding the length of a MAC PDU according to an exemplary embodiment of the present invention.

Referring to FIG. 8, it is determined in step 804 whether the size of the MAC PDU is greater than the maximum size of length that can be encoded in $Length_{Short}$ bits. If it is determined in step 804 that the size of the MAC PDU is less than or equal to the maximum size of length that can be encoded in $Length_{Short}$ bits, the length (represented as $Length_{Short}$) is set equal to the length of the MAC PDU in step 806. In step 808, the Length field of the GMH is set to $Length_{Short}$. In an exemplary embodiment, when the MAC PDU length is represented by $Length_{Short}$ in step 808 and an EH bit in the GMH is set to '1', the MAC PDU Length Extension field in the fixed portion of the EH group is set to zeros. The method then terminates.

On the other hand, if it is determined in step 804 that the size of the MAC PDU is greater than the maximum size of length that can be encoded in $Length_{Short}$ bits, the length is set equal to $Length_{Long}$ (as the length of the MAC PDU is longer than the maximum length that can be encoded in $Length_{Short}$ bits) in step 810. In an exemplary embodiment, the length, for example $Length_{Long}$, is then partitioned into a first part and a second part. In step 812, the Length field of the GMH is set to the first part of $Length_{Long}$. In an exemplary embodiment, the first part is a predefined number of bits. For example, the first part is equal to the number bits of a length field included in a GMH. In an exemplary embodiment, the first part is the predefined number of bits which are the LSBs of $Length_{Long}$. In another exemplary embodiment, the first part is the predefined number of bits which are the MSBs of $Length_{Long}$.

In step 814, an EH group is included in the MAC PDU and the EH field is set to '1'. In step 816, the second part is encoded in the EH of the MAC PDU. In an exemplary embodiment, the MSBs of $Length_{Long}$ are encoded in the fixed portion in the EH group. In another exemplary embodiment, the LSBs of $Length_{Long}$ are encoded in the fixed portion in the EH group. Then, the method is terminated.

Figure 9:
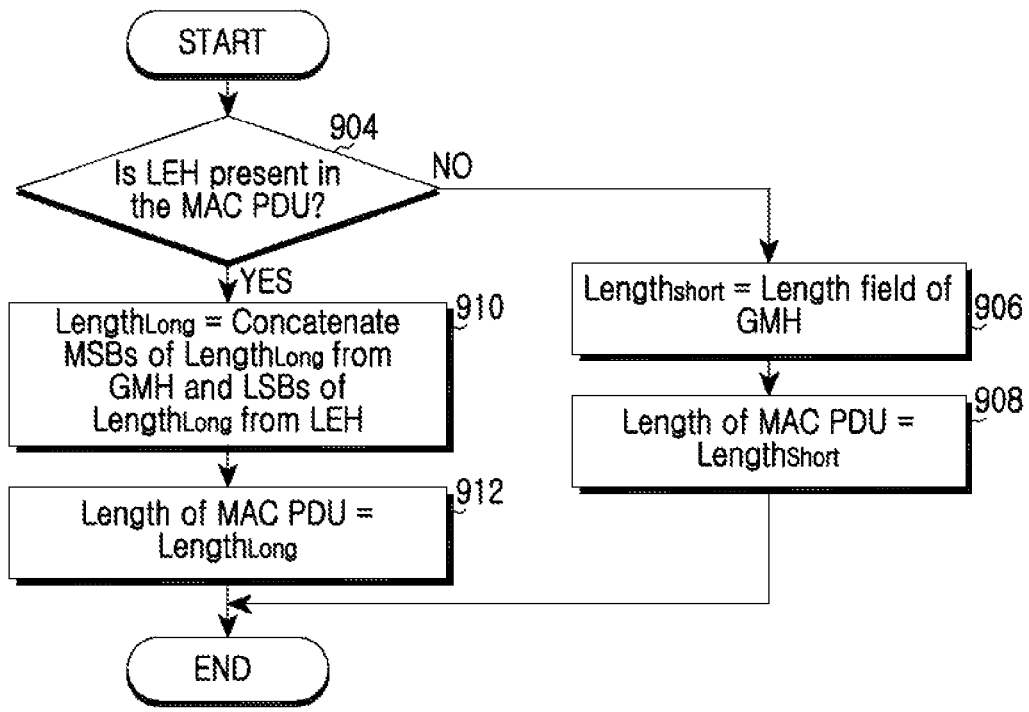
FIG. 9 is a flowchart illustrating a method for decoding the length of a MAC PDU according to an exemplary embodiment of the present invention.

FIG. 9 is a flowchart illustrating a method for decoding the length of a MAC PDU according to an exemplary embodiment of the present invention.

Referring to FIG. 9, it is determined in step 904 whether a MAC PDU that is received includes an LEH. If it is determined in step 904 that the MAC PDU does not include an LEH, the length of the MAC PDU ($Length_{Short}$) is set equal to the length field of the GMH in step 906. In step 908, the length of the MAC PDU is assigned as $Length_{Short}$. The method then terminates.

On the other hand, if it is determined in step 904 that the MAC PDU does include the LEH, the length ($Length_{Long}$) is decoded based on the GMH and the LEH in step 910. In accordance with an exemplary embodiment of the present invention, the MSB of $Length_{Long}$ is identified from the GMH and the LSB is identified from the LEH. In another exemplary embodiment, the LSB of $Length_{Long}$ is identified from the GMH and the MSB is identified from the LEH. Thereafter, the MSB and the LSB are concatenated to identify the complete length ($Length_{Long}$) of the MAC PDU. In step 912, the length of the MAC PDU is determined to be equal to the value of the $Length_{Long}$. Then, the method is terminated.

Figure 10:
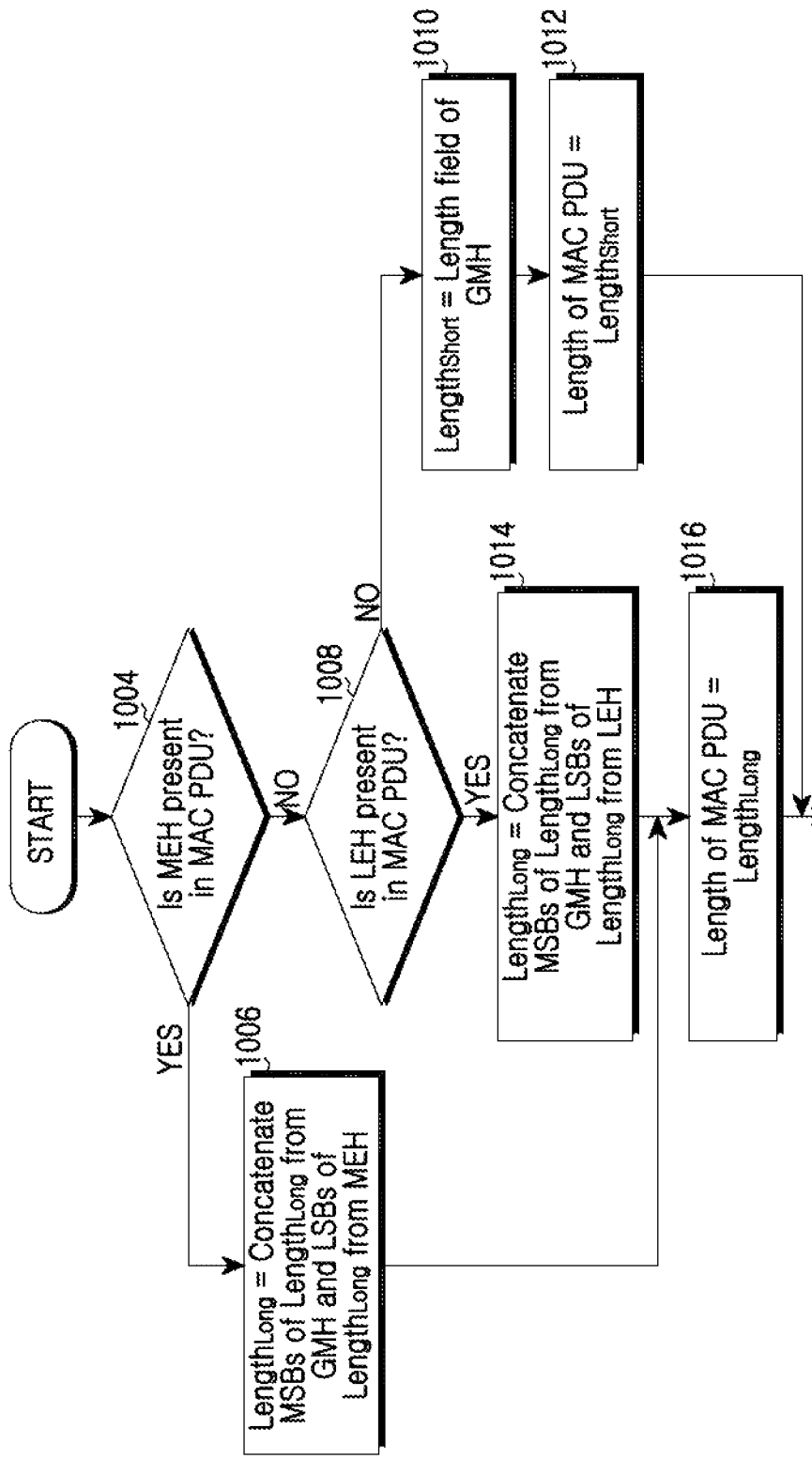
FIG. 10 is a flowchart illustrating a method for decoding the length of a MAC PDU according to an exemplary embodiment of the present invention.

FIG. 10 is a flowchart illustrating a method for decoding the length of a MAC PDU according to an exemplary embodiment of the present invention.

Referring to FIG. 10, it is determined in step 1004 if the MAC PDU includes an MEH. If it is determined in step 1004 that the MAC PDU includes the MEH, the length of the MAC PDU is decoded based on the GMH and the MEH in step 1006. That is, $Length_{Long}$ is identified from the GMH and MEH fields of the MAC PDU.

For example, the MSB of $Length_{Long}$ is identified from the GMH and the LSB of $Length_{Long}$ is identified from the MEH. Thereafter, the MSB and the LSB are concatenated and the length of the MAC PDU is decoded and assigned to the $Length_{Long}$. In step 1016, the length of the MAC PDU is identified as the $Length_{Long}$ value.

On the other hand, if it is determined in step 1004 that the MAC PDU does not include the MEH, it is determined in step 1008 if the MAC PDU that is received includes an LEH. If it is determined in step 1008 that the MAC PDU does not include an LEH, the length of the MAC PDU ($Length_{Short}$) is determined to be equal to the length field of the GMH in step 1010. In step 1012, the length of the MAC PDU is assigned as the value $Length_{Short}$.

On the other hand, if it is determined in step 1008 that the MAC PDU does include the LEH, the length ($Length_{Long}$) is decoded based on the GMH and the LEH in step 1014. In an exemplary embodiment, the MSB of $Length_{Long}$ is identified from the GMH and the LSB is identified from the LEH. In another exemplary embodiment, the LSB of $Length_{Long}$ is identified from the GMH and the MSB is identified from the LEH. Thereafter, the MSB and the LSB are concatenated to identify the complete length ($Length_{Long}$) of the MAC PDU. In step 1016, the length of the MAC PDU is assigned the value of $Length_{Long}$. Then, the method is terminated.

Figure 11:
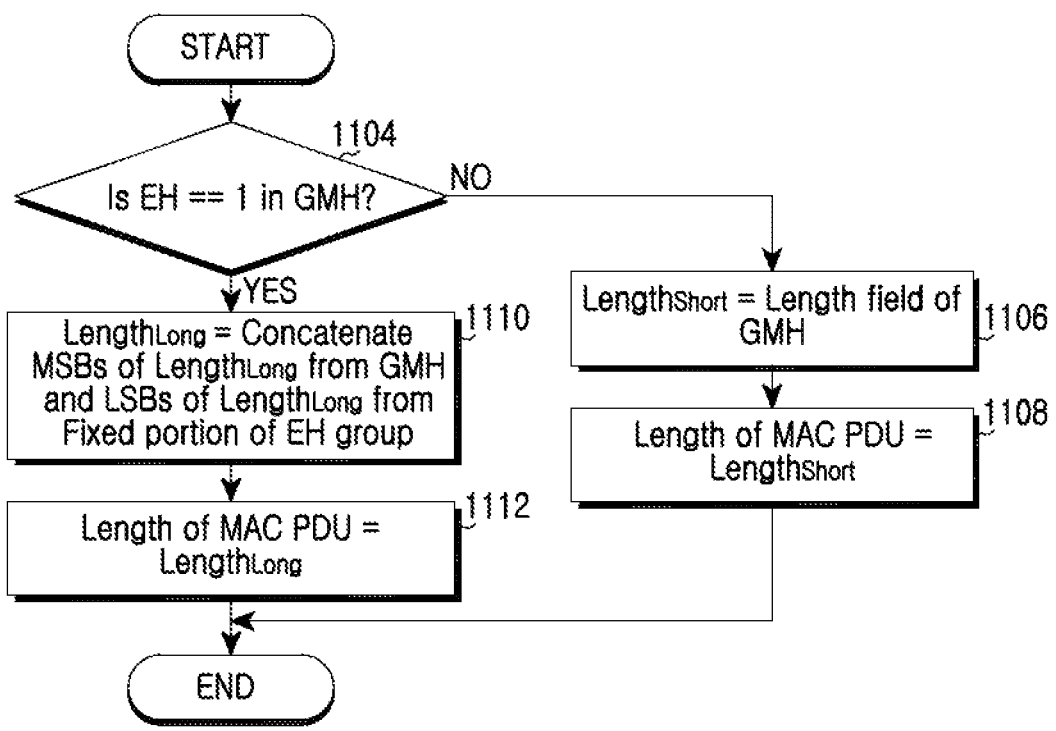
FIG. 11 is a flowchart illustrating a method for decoding the length of a MAC PDU according to an exemplary embodiment of the present invention.

FIG. 11 is a flowchart illustrating a method for decoding the length of a MAC PDU according to an exemplary embodiment of the present invention.

Referring to FIG. 11, it is determined in step 1104 if a MAC PDU that is received includes an EH. That is, it is determined whether the EH field in the GMH is set to '1'. If it is determined in step 1104 that the MAC PDU does not include the EH, the length of the MAC PDU ($Length_{Short}$) is determined to be equal to the length field of the GMH in step 1106. In step 1108, the length of the MAC PDU is assigned the value of the $Length_{Short}$. Thereafter, the method is terminated.

On the other hand, if it is determined in step 1104 that the MAC PDU is set to '1' and thus determined that the MAC PDU includes an EH, the length ($Length_{Long}$) is decoded based on the GMH and the EH group in step 1110. In accordance with an exemplary embodiment of the present invention, the MSB of $Length_{Long}$ is identified from the GMH and the LSB is identified from the EH group. In accordance with an exemplary embodiment of the present invention, the LSB of $Length_{Long}$ is identified from the GMH and the MSB is identified from the EH group. Thereafter, the MSB and the LSB are concatenated to identify the complete length ($Length_{Long}$) of the MAC PDU. In step 1112, the length of the MAC PDU is determined to be equal to the value of the $Length_{Long}$. Then, the method is terminated.

Figure 12:
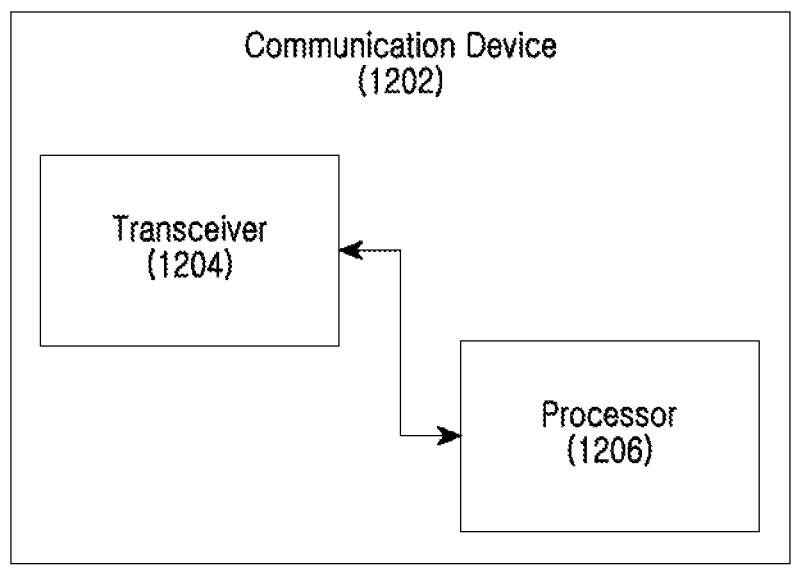
FIG. 12 illustrates a communication device according to an exemplary embodiment of the present invention.

FIG. 12 illustrates a communication device according to an exemplary embodiment of the present invention.

Referring to FIG. 12, a communication device 1202 is provided. The communication device can encode and decode the length of a MAC PDU. The communication device 1202 includes a transceiver 1204 and a processor 1206. The transceiver 1204 is capable of transmitting the MAC PDU that includes an encoded MAC PDU length. The transceiver 1204 is also capable of receiving a MAC PDU with encoded MAC PDU length.

The processor 1206 partitions the length of the MAC PDU in two parts when the length of the MAC PDU is greater than a first value. The processor 1206 encodes the first part of the two parts in a first header of the MAC PDU and the second part of the two parts in a second header of the MAC PDU. The processor 1206 encodes the length of the MAC PDU in the first header of the MAC PDU when the length of the MAC PDU is less than or equal to the first value.

The processor 1206 also decodes the length of the MAC PDU from a first and second header of the MAC PDU when the first header and second header are present in the MAC PDU. In an exemplary embodiment, the processor 1206 can decode the length of the MAC PDU from the first header of the MAC PDU when only the first header is present in the MAC PDU.

Figure 13:
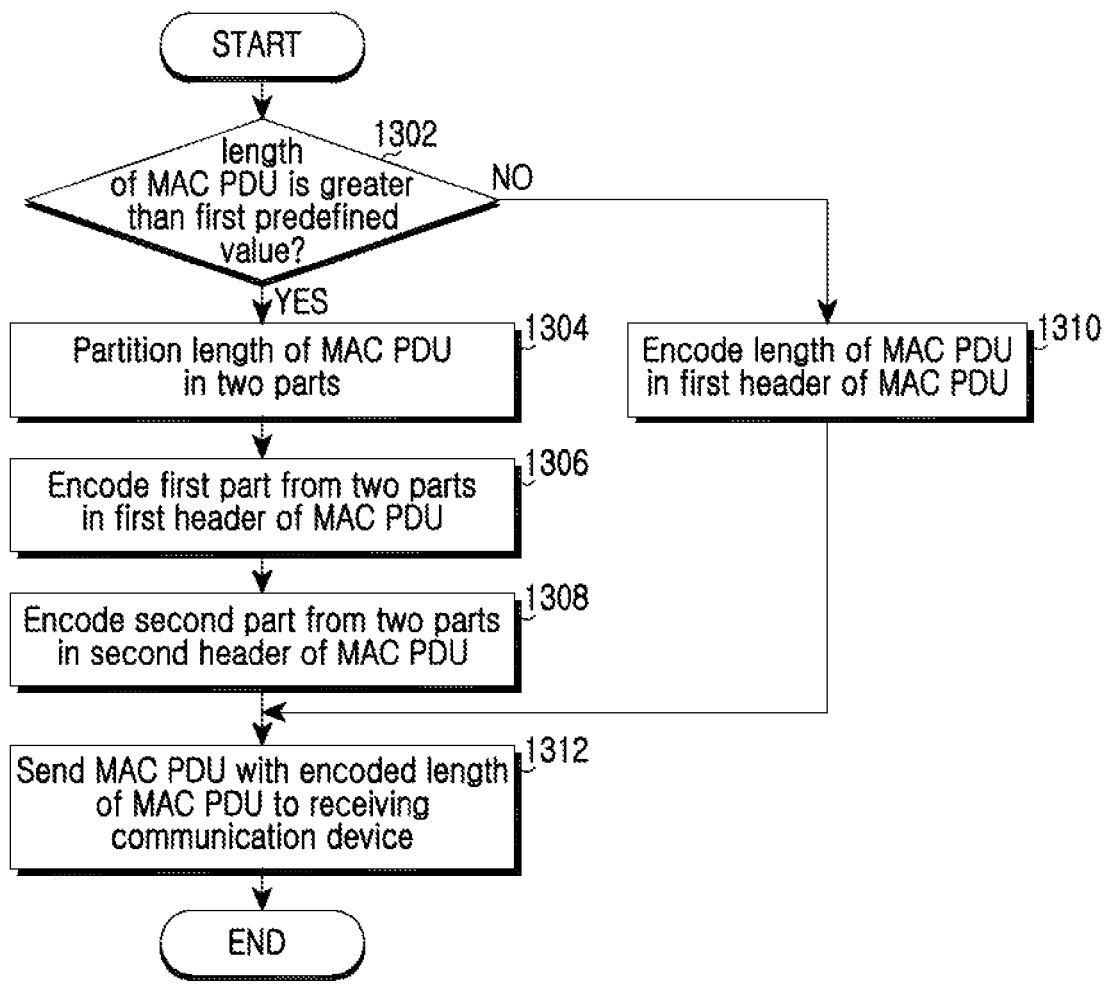
FIG. 13 is a flowchart illustrating a method for encoding the length of a MAC PDU according to an exemplary embodiment of the present invention.

FIG. 13 is a flowchart illustrating a method for encoding the length of a MAC PDU according to an exemplary embodiment of the present invention.

Referring to FIG. 13, it is determined in step 1302 whether the length of the MAC PDU is greater than a first predefined value.

If it is determined in step 1302 that the length of the MAC PDU is greater than the first predefined value, in step 1304 the length of the MAC PDU is partitioned into two parts including a first part and a second part. In accordance with an exemplary embodiment of the present invention, the first predefined value is a maximum number of bits represented by a length field in the first header of the MAC PDU. In step 1306, the first part of the two parts is encoded in a first header of the MAC PDU. In an exemplary embodiment, the size of the first part is a size in bits of a length field in the first header. In step 1308, the second part of the two parts is encoded in a second header of the MAC PDU. In accordance with an exemplary embodiment, the size of the second part is a difference between the length of the MAC PDU and the size of the first part. In another exemplary embodiment, the first header is a GMH and the second header is an EH group of the MAC PDU. Thus the first part is encoded in the Length field of the GMH.

In accordance with an exemplary embodiment of the present invention, the first part includes LSBs of the length of the MAC PDU and the second part includes MSBs of the length of the MAC PDU. In another exemplary embodiment, the first part includes MSBs of the length of the MAC PDU and the second part includes LSBs of the length of the MAC PDU.

Further, the second part may be encoded in the variable portion of the EH group. In an exemplary embodiment, the second part is encoded in the MEH when the MAC PDU is a multiplexed MAC PDU and is included in the LEH when the MAC PDU is a non-multiplexed MAC PDU. In another exemplary embodiment, the second part is encoded in the LEH for both multiplexed and non-multiplexed MAC PDU.

In accordance with an exemplary embodiment of the present invention, the second part is encoded in the fixed portion of the EH group. The second part can be encoded following the EH Group Length field in the fixed portion of the EH group. Further, the fixed portion of the EH group which carries the second part may be set to zeros in the MAC PDU and the EH field is set to '1' in the GMH when the MAC PDU length is less than the first predefined value.

If it is determined in step 1302 that the length of the MAC PDU is not greater than the first value, the length of the MAC PDU is encoded only in a first header of the MAC PDU in step 1310. This is done as the first header, for example the GMH in the MAC PDU is capable of conventionally supporting the length. At step 1312, the MAC PDU is transmitted with the encoded length of the MAC PDU to a receiving communication device. Then, the method is terminated.

Figure 14:
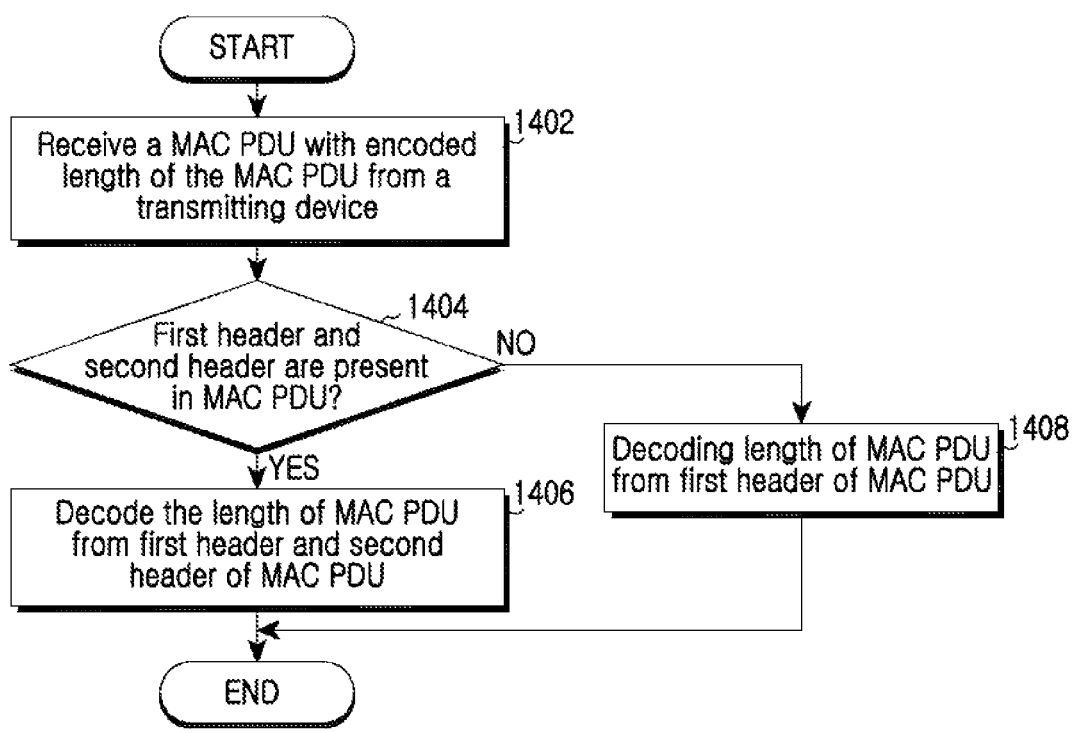
FIG. 14 is a flowchart illustrating a method for decoding the length of a MAC PDU according to an exemplary embodiment of the present invention.

FIG. 14 is a flowchart illustrating a method for decoding the length of a MAC PDU according to an exemplary embodiment of the present invention.

Referring to FIG. 14, a MAC PDU having an encoded length is received from a transmitting device in step 1402. In step 1404, the method determines whether the first header and second header are present in the MAC PDU. If it is determined in step 1404 that the first and second header are present in the MAC PDU, the length of the MAC PDU is decoded from the first header and the second header of the MAC PDU in step 1406.

The MSBs of received MAC PDU length are determined from a length field in the first header and LSBs of the received MAC PDU length are determined from a length field in the second header when the first and second header are present in the MAC PDU. In an exemplary embodiment, LSBs of received MAC PDU length are determined from a length field in the first header and MSBs of the received MAC PDU length are determined from a length field in the second header when the first and second header are present in the MAC PDU.

In accordance with an exemplary embodiment of the present invention, the first header is a GMH and the second header is an EH group of the MAC PDU. Hence, the length of the MAC PDU is determined based on the Length field in the GMH and a Length Extension field of the MAC PDU in the fixed portion of the EH group when the EH field in the GMH is set to one. In another exemplary embodiment, the length is based on the Length field in the GMH when the EH field in the GMH is set to zero.

In accordance with an exemplary embodiment of the present invention, the first header is a GMH and the second header is an LEH or an MEH. Hence, the decoding of the length is done from the EH field and the GMH field. Thus the length is determined based on a Length field in the GMH and a Length field in MEH in a multiplexed MAC PDU when the EH field in the GMH is set to one. In another exemplary embodiment, the length of the MAC PDU is decoded based on the LEH field and the GMH field. Thus the length of the received MAC PDU is determined based on a Length field in the GMH and a Length field in the LEH when the EH field in the GMH is set to one and the LEH is present in the non-multiplexed MAC PDU.

In accordance with another exemplary embodiment, the length of the MAC PDU is decoded by first decoding the EH field from the GMH and then determining the length of the received MAC PDU based on the length field in the GMH when the EH field in the GMH is set to zero. In accordance with an exemplary embodiment of the present invention, decoding the length of the MAC PDU includes decoding the EH field from the GMH and determining the length of the received MAC PDU based on length field in the GMH when the EH field in the GMH is set to one and the LEH is not present in the non multiplexed MAC PDU.

In accordance with an exemplary embodiment of the present invention, the first header is a GMH and a second header is an LEH. Thus the length of the MAC PDU is decoded by first decoding the EH field in the GMH, and then determining the length of the received MAC PDU based on the Length field in the GMH and the Length field in LEH. This is done when the EH field in the GMH is set to one and the LEH is present in the received MAC PDU.

On the other hand, if it is determined in step 1404 that the first and second header are not present in the MAC PDU, the length of the MAC PDU is decoded from a first header of the MAC PDU in step 1408. Similarly, the length of the MAC PDU is decoded by first decoding the EH field in the GMH and determining the length of the received MAC PDU based on the Length field in the GMH only when the EH field in the GMH is set to zero. In an exemplary embodiment, the length of the MAC PDU is decoded by first decoding the EH field in the GMH and then determining the length of the received MAC PDU based on the Length field in the GMH when the EH field in the GMH is set to one and the LEH is not present in the received MAC PDU.

Exemplary embodiments of the present invention provide apparatuses and methods to encode and decode the length of a MAC PDU. Exemplary methods encode the length that is larger than the Length field in the MAC PDU without affecting the efficiency of the system. The methods reduce the overhead of transmitting multiple MAC PDUs when the length of the multiplexed MAC PDU is greater than the allowed length. The methods further increase the efficiency of the overall network by transmitting fewer MAC PDUs with additional information. The method is compatible with the existing and standard structure of the MAC PDU, thus a need for an extra field and additional bits in the existing MAC PDU header is avoided In the preceding specification, the present invention and its advantages have been described with reference to exemplary embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

Exemplary embodiments of the present disclosure are related to the use of a computer system for implementing the techniques described herein. In one exemplary embodiment, the techniques are performed by a processor by using information included in a memory. Such information can be read into the main memory from a machine-readable medium, such as a storage device. The information included in the memory causes the processor to perform the method described herein.

The term "machine-readable medium" as used herein refers to any medium that participates in providing data that causes a machine to operate in a specific fashion. In accordance with an exemplary embodiment of the present invention, which is implemented using the computer system, various machine-readable mediums are involved, for example, in providing information to the processor for execution. The machine-readable medium can be a storage media. Storage media includes both non-volatile media and volatile media. Non-volatile media includes, for example, optical or magnetic disks, such as a server storage unit. Volatile media includes dynamic memory. All such media must be tangible to enable the information carried by the media to be detected by a physical mechanism that reads the information into a machine Common forms of machine-readable medium include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge.

In accordance with an exemplary embodiment of the present invention, the machine-readable medium can be a transmission media including coaxial cables, copper wire and fiber optics, including the wires that include a bus. Transmission media can also take the form of acoustic or light waves, such as those generated during radio-wave and infra-red data communications. Examples of machine-readable medium may include, but are not limited to, a carrier wave as or any other medium from which a computer can read, for example online software, download links, installation links, and online links.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for encoding a length of a Medium Access Control (MAC) Protocol Data Unit (PDU), the method comprising:
    partitioning the length of the MAC PDU into a first part and a second part when the length of the MAC PDU is greater than a first predefined value;
    encoding the first part in a header of the MAC PDU; encoding the second part in an extended header group of the MAC PDU, wherein the Extended Header (EH) group comprises at least one extended header and a field indicating the second part; and
    transmitting the MAC PDU with the encoded length of the MAC PDU to a receiving communication device,
    wherein the encoding of the second part comprising encoding the second part in a beginning of a fixed portion of the EH group.

2. The method of claim 1, wherein the size of the first part comprises a size in bits of a length field of the header.

3. The method of claim 1, wherein the size of the second part comprises a difference between the size in bits of the length of the MAC PDU and the size of the first part.

4. The method of claim 1, wherein the first predefined value comprises a maximum length of the MAC PDU represented by a length field in the header of the MAC PDU.

5. The method of claim 1, wherein the encoding of the first part comprises encoding the first part in a length field of the header.

6. The method of claim 1, wherein the encoding of the second part comprises encoding the second part in a variable portion of the EH group.

7. The method of claim 1, wherein the fixed portion of the EH group which carries the second part is set to zeros in the MAC PDU and the EH field is set to '1' in the header when the length of the MAC PDU is less than or equal to the first predefined value.

8. The method of claim 1, wherein the first part includes Least Significant Bits (LSBs) of the length of the MAC PDU and the second part includes Most Significant Bits (MSBs) of the length of the MAC PDU.

9. The method of claim 1, wherein the first part includes Most Significant Bits (MSBs) of the length of the MAC PDU and the second part includes Least Significant Bits (LSBs) of the length of the MAC PDU.

10. A method for decoding a length of a Medium Access Control (MAC) Protocol Data Unit (PDU), the method comprising:
receiving the MAC PDU with encoded length of the MAC PDU from a transmitting device; and
decoding the length of the MAC PDU from a first part in a header of the MAC PDU and a second part in an Extended Header (EH) group of the MAC PDU,
wherein the EH group comprises at least one extended header and a field indicating the second part,
wherein the second part is included when the length of the MAC PDU is greater than a first predefined value, and
wherein Least Significant Bits (LSBs) of the received MAC PDU length are determined from a length field in the header and Most Significant Bits (MSBs) of the received MAC PDU length are determined from a length field in the EH group.

11. The method of claim 10, wherein the decoding of the length of the MAC PDU further comprises decoding the EH field from the header and determining the length of the received MAC PDU based on a length field in the header and a length extension field of the MAC PDU in a fixed portion of the EH group when the EH field in the header is set to one.

12. The method of claim 10, wherein the decoding of the length of the MAC PDU comprises decoding the EH field from the header and determining the length of the received MAC PDU based on a length field in the header when the EH field in the header is set to zero.

13. A communication device for encoding a length of a Medium Access Control (MAC) Protocol Data Unit (PDU), the device comprising:
a transceiver for transmitting a MAC PDU including an encoded length; and a processor for partitioning the length of the MAC PDU into a first part and a second part and encoding the first part in a header of the MAC PDU and the second part in an EH group of the MAC PDU when the length of the MAC PDU is greater than a first predefined value, and for encoding the length of the MAC PDU in the header of the MAC PDU when the length of the MAC PDU is less than or equal to the first predefined value,
wherein the processor encodes the second part comprises encoding the second part in a beginning of a fixed portion of the EH group.

14. The device of claim 13, wherein the size of the first part comprises a size in bits of a length field of the header.

15. The device of claim 13, wherein the size of the second part comprises a difference between the size in bits of the length of the MAC PDU and the size of the first part.

16. The device of claim 13, wherein the first predefined value comprises a maximum length of the MAC PDU represented by a length field in the header of the MAC PDU.

17. The device of claim 13, wherein the processer encodes the first part in a length field of the header.

18. The device of claim 13, wherein the processer encodes the second part in a variable portion of the EH group.

19. The device of claim 13, wherein the fixed portion of the EH group which carries the second part is set to zeros in the MAC PDU and the EH field is set to '1' in the header when the length of the MAC PDU is less than or equal to the first predefined value.

20. A communication device for decoding a length of a Medium Access Control (MAC) Protocol Data Unit (PDU), the device comprising:
a transceiver for receiving the MAC PDU with encoded length of the MAC PDU from a transmitting device; and
a processor for decoding the length of the MAC PDU from a first part in a header of the MAC PDU and a second part in an Extended Header (EH) group of the MAC PDU, wherein the extended header group comprises at least one extended header and a field indicating the second part,
wherein the second part is included when the length of the MAC PDU is greater than a first predefined value;
wherein Least Significant Bits (LSBs) of the received MAC PDU length are determined from a length field in the header and Most Significant Bits (MSBs) of the received MAC PDU length are determined from a length field in the EH group.

21. The device of claim 20, wherein the processer decodes the length of the MAC PDU by decoding the EH field from the header and determining the length of the received MAC PDU based on a length field in the header and a length extension field of the MAC PDU in a fixed portion of the EH group when the EH field in the header is set to one.

22. The device of claim 20, wherein the processer decodes the length of the MAC PDU by decoding the EH field from the header and determining the length of the received MAC PDU based on a length field in the header when the EH field in the header is set to zero.

* * * * *